Figures 1, 2:
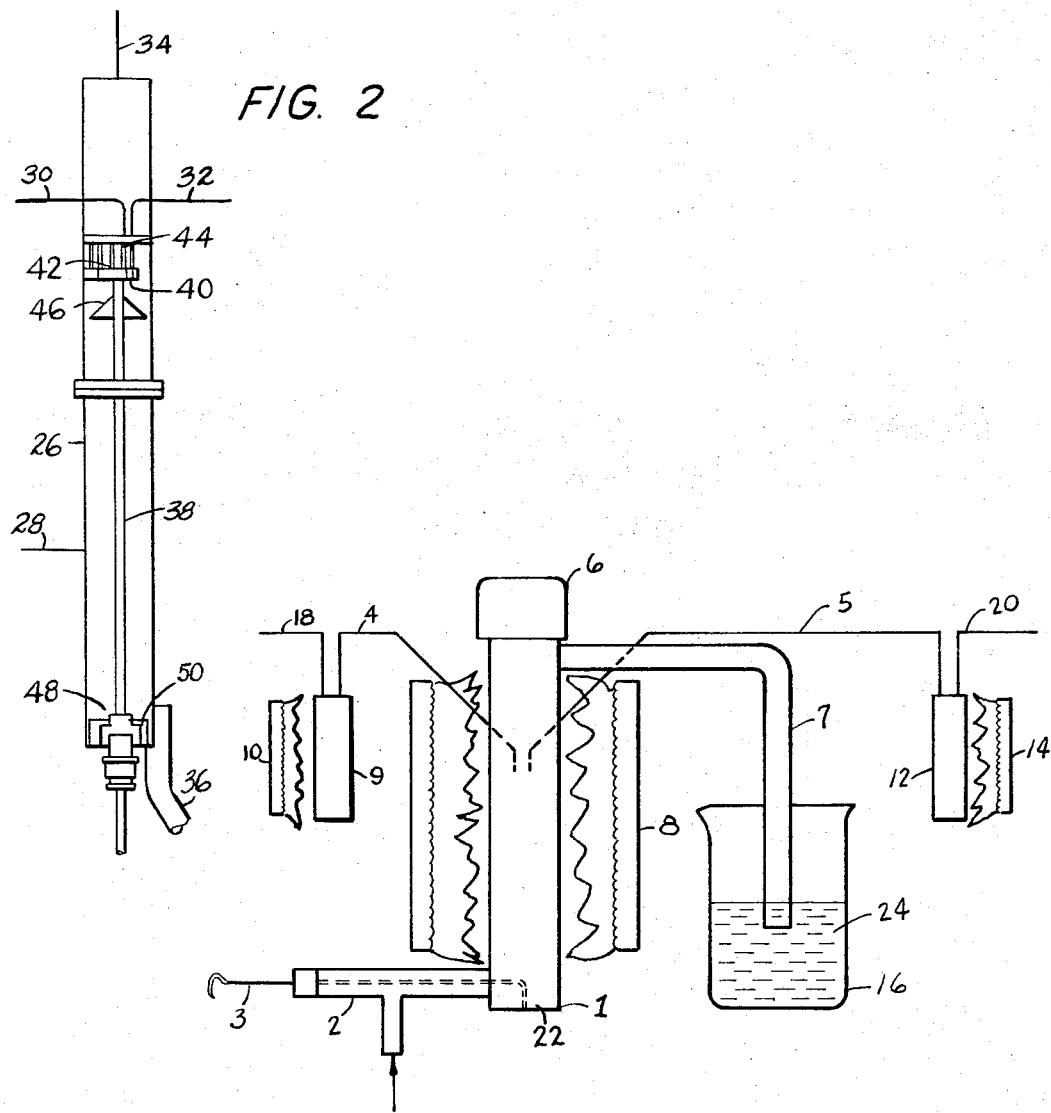

Dec. 20, 1966   R. E. JONES   3,293,025
PRODUCTION OF ELEMENTAL CESIUM
Filed March 27, 1964

ROY E. JONES
INVENTOR.

BY *[signature]*
ATTORNEY.

3,293,025
PRODUCTION OF ELEMENTAL CESIUM
Roy E. Jones, Trona, Calif., assignor to American Potash & Chemical Corporation, Los Angeles, Calif., a corporation of Delaware
Filed Mar. 27, 1964, Ser. No. 355,233
5 Claims. (Cl. 75—66)

The present invention relates to the production of elemental cesium. More particularly, the present invention relates to process and apparatus for producing elemental cesium from molten cesium carbonate and a metallic reductant.

Considerable difficulty was experienced in producing elemental cesium from cesium carbonate because of the extreme reactivity of elemental cesium and because no adequate means of continuous production were available.

According to the present invention, elemental cesium is produced in a batch, semi-continuous or continuous manner, as is desired, using molten cesium carbonate and a molten metallic reductant in the apparatus of the present invention. More particularly, the process of the present invention comprises intimately admixing and reacting molten cesium carbonate and a molten metallic reductant. The reaction is conducted at an elevated temperature, and an inert environment is maintained throughout the entire reaction system.

The apparatus of this invention is comprised of a reactor vessel which is provided with a supply system for the molten reactants including metering devices for controlling the rate at which the molten reactants are supplied to the vessel. The molten reactants are introduced to a reaction zone in the reactor vessel. The reaction zone is provided with a stirring means to insure adequate intermixture of the reactants. Heat is supplied to the system to melt the reactants and insure that they remain molten throughout the reaction. An outlet is provided in the reactor vessel for removing the vaporized elemental cesium from the reactor vessel.

For a more complete understanding of the present specification, reference is made to the following description taken in conjunction with the appended drawings in which FIG. 1 is a schematic drawing of a cesium metal reactor of this invention; and FIG. 2 is a schematic drawing of a continuous cesium metal reactor of this invention.

FIG. 1 shows an apparatus used to carry out a batch reductant reaction between molten cesium carbonate and a molten metallic reductant. A closed reactor vessel 1 is fitted with an inert gas inlet conduit 2, stirring means 3, a molten cesium carbonate feeder conduit 4, a molten metallic reductant feeder conduit 5, a removable end closure means 6 and a cesium vapor delivery conduit 7. Heat is supplied to reactor 1 by heating means 8. The cesium carbonate melting pot 9 is a closed container which is heated by heating means 10. The metallic reductant melting pot 12 is a closed container which is heated by heating means 14. A cesium receiver means 16 is positioned at the exit end of vapor delivery conduit 7. Molten reactant is forced out of melting pots 9 and 12 by the pressure of inert gas supplied to the melting pots through conduits 18 and 20, respectively. The molten reactants which are forced out of melting pots 9 and 12 are conveyed through conduits 4 and 5, respectively, into reaction zone 22 inside of reactor 1. The molten reactants are thoroughly intermixed by stirring device 3 in reaction zone 22. As the reaction proceeds, the reaction temperature is maintained in reactor 1 by heating means 8. Elemental cesium vapor is conveyed away from reactor 1 through conduit 7 into receiver 16. Conveniently, receiver 16 contains mineral oil 24 and the outlet of conduit 7 is positioned beneath the surface of mineral oil 24.

FIG. 2 shows an apparatus adapted for use in carrying out a continuous reduction reaction between molten cesium carbonate and a molten metallic reductant. A closed steel reactor vessel 26 is fitted with an inert gas inlet 28, a molten cesium carbonate inlet 30, a molten metallic reductant inlet 32, a cesium removal outlet 34, and a slag removal outlet 36. In addition to these material inlet and outlet means, reactor 26 is fitted with a rotatable shaft 38, to which is affixed a rotatable disc 40. Rotatable disc 40 is positioned in reaction zone 42 and is in juxtaposition to stationary plows 44. A radiant heat reflector 46 is positioned beneath reaction zone 42. Slag is removed from reactor 26 in slag removal zone 48. Discharge of the slag from the slag removal zone 48 is accomplished by rotary plows 50 attached to rotatable shaft 38. Slag leaves the reaction zone after it is deflected off the side of rotating disc 40 by stationary plows 44. The slag passes through reactor 26 until it reaches slag removal zone 48 wherein it is contacted by rotatable plows 50 and guided thereby into slag removal outlet 36.

A continuous reaction is initiated by introducing molten reactants at metered, predetermined rates, to reaction zone 42 through inlets 30 and 32, respectively. Heat is supplied to the reactor by any suitable means such as gas burners, electric heaters (not shown) and the like. Reaction is initiated as soon as the molten reactants contact one another in reaction zone 42. Elemental cesium vapor passes out of reactor 26 through cesium outlet 34 to an appropriate condensation point (not shown). Shaft 38 is rotated slowly during the reaction to admix the reactants and discharge the slag when the extractable cesium values have been removed therefrom. Radiant heat reflector 46 is used to maintain and control the temperature of the reaction zone at a predetermined value.

Accurate metering, of the supply of molten reactants to reactor vessel 26, is required to insure complete reaction and to avoid the generation of excessive heat in reaction zone 42. Accurate metering can be accomplished by any suitable metering means, including, for example, mechanical pumps, accurately controlled gas pressure, and the like. Preferably, metering of reactants is accomplished by the application of carefully regulated inert gas pressure to the molten reactants so as to force them into the reactor at a rate proportional to the pressure of the inert gas.

In carrying out the continuous process of this invention, the reactants are preferably melted at some point remote from the reaction zone. This procedure conveniently provides for the removal of the water of hydration, lost by cesium carbonate during the melting operation, before the cesium carbonate reaches the reaction zone. Since elemental cesium hydrolyzes readily, it is highly desirable to remove the last traces of water from the reactants before any elemental cesium is produced. The use of molten reactants permits continuous operation with accurate control of reactant flow rates. When liquid reactants are employed, only one moving part is required in the reactor vessel itself. Some means must generally be provided for agitating the reactants. In our preferred embodiment, the one moving part is a rotating shaft which activates both a stirring device for mixing the liquid reactants and a scraper for removing the slag. The simplicity permitted by the use of liquid reactants facilitates the sealing of the reactor vessel.

The cesium carbonate melts at about 610° C. and may be supplied to the reaction zone at any temperature above about 610° C. but below the decomposition temperature of cesium carbonate. Cesium carbonate decomposes above 1100° C.

The metallic reductant is heated to a temperature sufficient to render it molten and is supplied to the reaction in this molten state at any temperature up to the vaporization temperature of the metallic reductant. The permissible temperatures will vary depending upon the specific metallic reductant. Generally, the temperature of the metallic reductant is kept as low as possible so that its vapor pressure will be low.

Condensation of the elemental cesium can be achieved in any desired manner, for example, by leading the cesium vapor into a quencher where it is sprayed with a cooled mineral oil. In place of mineral oil, any liquid having a low vapor pressure, which has a lower specific gravity than cesium, and does not react with cesium, may be employed. Alternately, the cesium vapor may be introduced under the surface of a cooled inert liquid. The cesium vapor may also be condensed by contacting it with cool gases or by impinging it upon a cool surface.

The reaction mixture, in accordance with this process, can be agitated in any way desired, for example, by mechanical agitators such as shown in FIGURES 1 and 2, by spraying the molten reactants together, by placing them in a slowly rotating drum, or by agitating them with a stream of inert gas or other fluid, and the like.

The reaction of this invention should be carried out at a temperature above the melting point of the highest melting reactant, and is conveniently conducted at a temperature of from about 750° C. to about 1100° C., preferably from about 800° C. to about 1050° C. The reaction temperature should be kept as low as possible so that the vapor pressure of the molten metallic reductant remains at a low value. As the vapor pressure of the molten reductant increases, more of this material is carried away from the reactor with the cesium vapor. As the cesium vapor cools, it alloys with any reductant which is present.

The reaction of this invention is of the exothermic thermite type so that care must be taken to avoid the presence of an excessive amount of reactant in the reaction zone at any one time. Given thorough admixing, it has been found that no more than about 2 pounds of molten reactants, assuming they are present in stoichiometric amounts, should be present in one reaction mass at any one time. Preferably, lesser amounts of reactants are used. This quantity of reactant can be achieved by establishing a large mass of one reactant and slowly introducing small amounts of the second reactant, or, preferably, approximately stoichiometric amounts of reactants are intermixed in small portions using apparatus such as that shown in FIGS. 1 and 2.

In the specification, claims and following specific examples, all parts and percentages are by weight unless otherwise indicated. The following examples are set forth to further illustrate and not to limit the invention.

EXAMPLE I

This example is illustrative of the batch reaction of molten cesium carbonate with molten magnesium to produce elemental cesium.

A 30 gram sample of cesium carbonate is heated by a gas burner in a nickel crucible until it is molten. A one inch strip of magnesium ribbon is dropped into the molten carbonate. No evidence of reaction is noted until the strip of magnesium has completely disappeared at which time vapor is emitted from the surface of the mixture. The vapor ignites immediately in the gas flame surrounding the crucible and burns with a violet color, indicating the presence of cesium.

EXAMPLE II

This example is illustrative of the batch reaction of molten cesium carbonate with molten magnesium resulting in the production and recovery of elemental cesium.

The apparatus shown in FIG. 1 is used to carry out a reduction reaction between molten cesium carbonate and molten magnesium. The reactor vessel is fabricated from 316 stainless steel, as are the two melting pots. Argon is used as the inert gas and mineral oil is used in the cesium receiver to condense the cesium metal. The reactor vesel, lines and melting pots are heated by gas-air burners. The cesium carbonate melting pot is filled with 100 grams (0.31 mole) of cesium carbonate and the other melting pot is filled with 25 grams (1.06 moles) of magnesium metal turnings. Prior to heating, air in the apparatus is swept out with argon which has been passed over magnesium perchlorate and hot titanium metal to remove water and oxygen. This argon sweep is maintained throughout the reaction. After sweeping the entire apparatus with argon for a period of 30 minutes, the reactor, melting pots and feeder lines are heated to 900° C. Argon is introduced to both of the melting pots simultaneously, forcing the molten reactant through the feeder tubes to the reactor. Cesium metal begins to distill over as soon as the molten reactants contact one another in the reactor. The molten reactants are stirred together to provide contact and thorough mixing. The flow rate of cesium vapor to the oil filled receiver is found to be approximately proportional to the degree of mixing of the molten reactants. The temperature of the reaction is maintained at 900° C. to 950° C. for one hour after the melting pots have been emptied into the reactor. The apparatus is cooled and disassembled under oil. 30 grams of metal product are collected in the receiver which equals a yield of 40% of theoretical. Analysis of the metal product collected in the receiver shows that it is 90.4% cesium and 9.6% magnesium.

Substitution of any one of lithium, sodium, potassium, rubidium, calcium, barium or aluminum for the magnesium in this example, produces comparable yields of elemental cesium. Magnesium and sodium are the preferred metallic reductants. Mixtures of metallic reductants may be used.

The use of helium or neon as the inert atmosphere in this example does not materially affect the process or the product. Likewise, the use of a vacuum in the reactor vessel does not materially alter the process or product.

As will be understood by those skilled in the art, what has been described is the preferred embodiment of the invention. However, many modifications, changes and substitutions can be made therein without departing from the scope and spirit of the following claims.

What is claimed it:
1. Process for producing elemental cesium comprising:
preparing a first melt consisting essentially of cesium carbonate;
preparing a second melt consisting essentially of a metallic reductant;
continuously conducting a portion of said first melt and a portion of said second melt into a reaction zone, said reaction zone having an inert environment;
continuously admixing and reacting said first and second melts in said reaction zone to produce vaporous elemental cesium; and
continuously conducting said vaporous elemental cesium away from said reaction zone.
2. Process for producing elemental cesium comprising:
preparing a first molten reactant consisting of cesium carbonate;
preparing a second molten reactant consisting of a metallic reductant selected from the group consisting of magnesium, lithium, sodium, potassium, rubidium, calcium, barium and aluminum;
continuously conducting a portion of said first molten reaction and a portion of said second molten reactant into a reaction zone, said reaction zone having an inert environment and being maintained at a temperature of from about 750° C. to 1100° C.;
continuously admixing and reacting said molten reactants in said reaction zone to produce vaporous elemental cesium; and
continuously conducting said vaporous elemental cesium away from said reaction zone.

3. Process for producing elemental cesium comprising:
preparing a first molten reactant consisting of cesium carbonate;
preparing a second molten reactant consisting of magnesium;
continuously conducting a portion of said first molten reactant and a portion of said second molten reactant into a reaction zone, said reaction zone having an inert environment and being maintained at a temperature of from about 800° C. to 1050° C.;
continuously admixing and reacting said molten reactants in said reaction zone to produce vaporous elemental cesium; and
continuously conducting said vaporous elemental cesium away from said reaction zone.

4. Process for producing elemental cesium comprising:
preparing molten cesium carbonate;
preparing molten sodium;
continuously conducting a portion of said molten cesium carbonate and a portion of said molten sodium into a reaction zone, said reaction zone having an inert environment and being maintained at a temperature of from about 750° C. to 1100° C.;
continuously admixing and reacting said molten cesium carbonate and said molten sodium in said reaction zone to produce vaporous elemental cesium; and
continuously conducting said vaporous elemental cesium away from said reaction zone.

5. Process for producing elemental cesium comprising:
preparing a first melt consisting essentially of cesium carbonate, and maintaining said first melt at a temperature above its melting point and below the decomposition temperature of cesium carbonate;
preparing a second melt consisting essentially of a metallic reductant, and maintaining said second melt at a temperature above the melting point of said reductant and below the boiling point of said reductant;
continuously conducting a portion of said first melt and a portion of said second melt into a reaction zone, said reaction zone having an inert environment and being maintained at a temperature of from about 750° C. to 1100° C.;
continuously admixing and reacting said streams in said reaction zone to produce vaporous elemental cesium;
continuously conducting said vaporous elemental cesium away from said reaction zone; and
continuously condensing said vaporous cesium.

References Cited by the Examiner

UNITED STATES PATENTS

| | | | |
|---|---|---|---|
| 2,028,390 | 1/1936 | Hanson | 75—66 |
| 2,613,074 | 10/1952 | Woods | 266—15 |
| 2,774,663 | 12/1956 | Kirk | 75—66 |
| 2,852,363 | 9/1958 | Adams et al. | 75—66 |
| 2,930,689 | 3/1960 | McGriff | 75—66 |
| 3,065,958 | 11/1962 | Cerych et al. | 266—15 |
| 3,130,010 | 4/1964 | Moolenaar et al. | 75—66 X |
| 3,201,229 | 8/1965 | Blue et al. | 75—66 |
| 3,207,598 | 9/1965 | Berthold | 75—66 X |

DAVID L. RECK, *Primary Examiner.*

HYLAND BIZOT, H. W. TARRING,
*Assistant Examiners.*